(Model.)

G. DIETZEL & S. GREEN.
CHENILLE ORNAMENT.

No. 282,709.   Patented Aug. 7, 1883.

WITNESSES:
Dorn Twitchell
C. Sedgwick

INVENTOR:
G. Dietzel
S. Green
BY Munn & Co
ATTORNEYS.

UNITED STATES PATENT OFFICE.

GEORGE DIETZEL AND SAMUEL GREEN, OF NEW YORK, N. Y.

CHENILLE ORNAMENT.

SPECIFICATION forming part of Letters Patent No. 282,709, dated August 7, 1883.

Application filed January 30, 1883. (Specimens.)

*To all whom it may concern:*

Be it known that we, GEORGE DIETZEL and SAMUEL GREEN, both of the city, county, and State of New York, have invented certain new and Improved Chenille Ornaments, of which the following is a full, clear, and exact description.

The object of our invention is to provide new and improved ornaments and trimmings made of chenille having a varying diameter—for instance, such ornaments as branches and twigs of leaves and flowers, rosettes, hat-bands, and other ornaments.

The invention consists in ornaments formed of pieces of chenille having a varying diameter or wefts of different lengths, which pieces of chenille are secured to stems or branches. Overspun balls, pellets, beads, or tufts can also be suspended from the stems by means of cords, in addition to the pieces of chenille.

Reference is to be had to the accompanying drawings, forming part of this specification, in which similar letters of reference indicate corresponding parts in all the figures.

Figure 1:
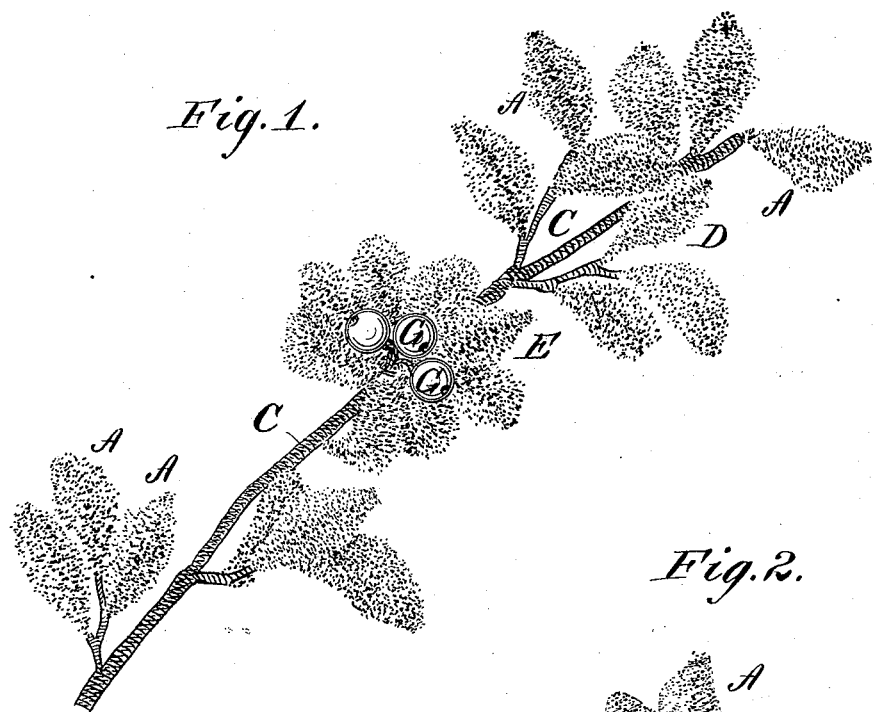
Figure 2:
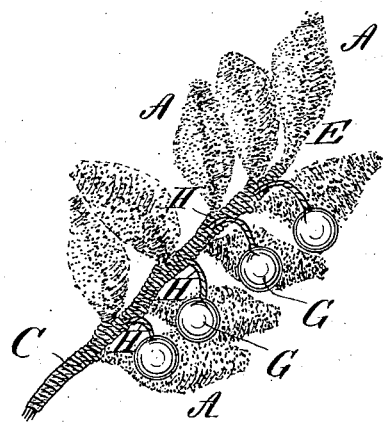
Figure 3:
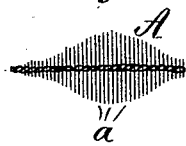
Figure 4:

Figures 1 and 2 show perspective views of branches of leaves and flowers made of chenille of varying diameter. Figs. 3 and 4 show longitudinal sectional elevations of pieces of chenille of varying diameter.

Chenille made with a varying diameter—that is, chenille which is made alternately thicker and thinner, according to any desired pattern, which chenille is known by the trade-name of "figured chenille" or "grelot"—is cut into pieces A, and the same are attached to silk-covered wires C, or any other suitable stems, to form leaves D and flowers E. We have shown the leaves made of pieces of chenille having an ellipsoidal shape—that is, their diameter gradually increases from one end to the middle, and then decreases regularly toward the other end, as is shown in Fig. 3; but the pieces of chenille can have any other suitable shape—as for instance, as is shown in Fig. 4, in which the diameter is suddenly increased at one end to form a tuft or ball, F. The pieces of chenille may be attached to the stems or branches singly or in groups of two or more, and can be arranged radially around a central ball or button to form a rosette, bell, cone, or other ornament. Overspun balls G, or glass, metal, or other pellets or tufts of cotton, worsted, or silk can be attached by means of cords or wires H from the stems, and produce very handsome effects in combination with the pieces of chenille. As is shown in Figs. 3 and 4, the varying thickness of the chenille is not produced by doubling over or knotting the chenille, which is old and well known, but by making the radial threads or wefts *a* forming the chenille of different lengths.

Having thus described our invention, what we claim as new, and desire to secure by Letters Patent, is—

Artificial flowers or other ornaments formed of chenille pieces of the specific character described—that is to say, varying in diameter at intervals by reason of the differing lengths of the weft-threads—said pieces being secured to stems or branches, substantially as described.

GEO. DIETZEL.
SAMUEL GREEN.

Witnesses:
A. DANZER,
EMERSON JUBER.